(12) United States Patent
Meagher et al.

(10) Patent No.: US 11,067,751 B2
(45) Date of Patent: Jul. 20, 2021

(54) TRENCH-BASED OPTICAL COMPONENTS FOR PHOTONICS CHIPS

(71) Applicant: GLOBALFOUNDRIES U.S. Inc., Santa Clara, CA (US)

(72) Inventors: Colleen Meagher, Beacon, NY (US); Karen Nummy, Newburgh, NY (US); Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/597,323

(22) Filed: Oct. 9, 2019

(65) Prior Publication Data

US 2021/0109283 A1    Apr. 15, 2021

(51) Int. Cl.
*G02B 6/122* (2006.01)
*G02B 6/136* (2006.01)
*G02B 6/12* (2006.01)

(52) U.S. Cl.
CPC ........... *G02B 6/1225* (2013.01); *G02B 6/136* (2013.01); *G02B 2006/12061* (2013.01)

(58) Field of Classification Search
CPC ........ G02B 6/26; G02B 6/122; G02B 6/1225; G02B 6/132; G02B 6/136; G02B 2006/12061; G02F 1/0147; G02F 1/025; H01L 33/00
USPC ............................. 385/50, 129–131; 438/31
See application file for complete search history.

(56) References Cited

U.S. PATENT DOCUMENTS

| | | | |
|---|---|---|---|
| 5,858,861 A | 1/1999 | Weng et al. | |
| 5,873,948 A | 2/1999 | Kim | |
| 6,033,996 A | 3/2000 | Rath et al. | |
| 6,066,267 A | 5/2000 | Rath et al. | |
| 7,010,208 B1 | 3/2006 | Gunn, III et al. | |
| 7,941,023 B2 | 5/2011 | Patel et al. | |
| 8,778,210 B2 | 7/2014 | Cooper et al. | |
| 10,509,244 B1 * | 12/2019 | Shank | G02F 1/0147 |
| 2007/0286552 A1 * | 12/2007 | Aalto | G02B 6/125 385/50 |
| 2017/0146740 A1 | 5/2017 | Orcutt et al. | |

OTHER PUBLICATIONS

Laurent Gasca, "From O to L: The Future of Optical-Wavelength Bands", Broadband Properties, Jun. 2008, p. 83.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

* cited by examiner

*Primary Examiner* — Michael P Mooney
(74) *Attorney, Agent, or Firm* — Thompson Hine LLP; Francois Pagette (57) ABSTRACT

Structures including a waveguide core and methods of fabricating a structure that includes a waveguide core. A dielectric layer including a trench with a first sidewall and a second sidewall, and a waveguide core positioned inside the trench between the first and second sidewalls of the trench. The waveguide core has a first width, and the trench has a second width between the first and second sidewalls that is greater than the first width.

20 Claims, 9 Drawing Sheets

TRENCH-BASED OPTICAL COMPONENTS FOR PHOTONICS CHIPS

BACKGROUND

The present invention relates to photonics chips and, more specifically, to structures including a waveguide core and methods of fabricating a structure that includes a waveguide core.

Photonics chips are used in many applications and systems including, but not limited to, data communication systems and data computation systems. A photonics chip integrates optical components, such as waveguide cores and bends, and electronic components, such as field-effect transistors, into a unified platform. Among other factors, layout area, cost, and operational overhead may be reduced by the integration of both types of components into the unified platform.

Certain photonics chips may include optical components with waveguide cores in a level that is arranged over a level containing the electronic components. These waveguide cores may be formed in the process flow after the electronic components are formed. As a result, etching processes used to form these waveguide cores may adversely impact the electronic components due to inadequate masking.

Improved structures including a waveguide core and methods of fabricating a structure that includes a waveguide core are needed.

SUMMARY

In an embodiment of the invention, a structure includes a dielectric layer having a trench with a first sidewall and a second sidewall, and a waveguide core positioned inside the trench between the first sidewall and the second sidewall of the trench. The waveguide core has a first width, and the trench has a second width between the first sidewall and the second sidewall that is greater than the first width of the waveguide core.

In an embodiment of the invention, a method depositing a dielectric layer over a substrate, patterning a trench in the dielectric layer that includes a first sidewall and a second sidewall, and forming a waveguide core that is positioned inside the trench between the first sidewall and the second sidewall of the trench. The waveguide core has a first width, and the trench has a second width between the first sidewall and the second sidewall that is greater than the first width of the waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 7A is a top view in which FIG. 7 is taken generally along line 7-7.

DETAILED DESCRIPTION

Figure 1:
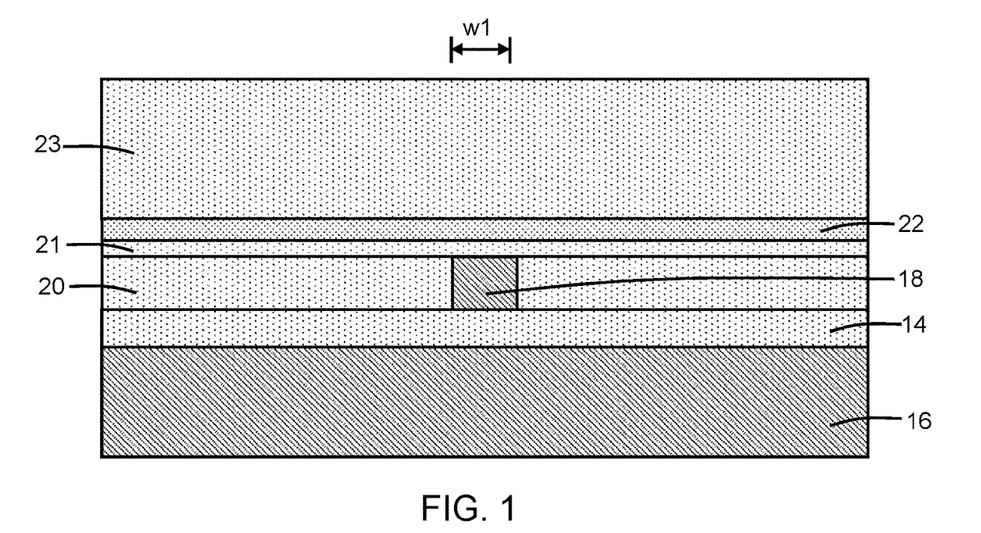
FIG. 1 is a cross-sectional view of a photonics chip including a structure at an initial fabrication stage of a processing method in accordance with embodiments of the invention.
Figure 2:
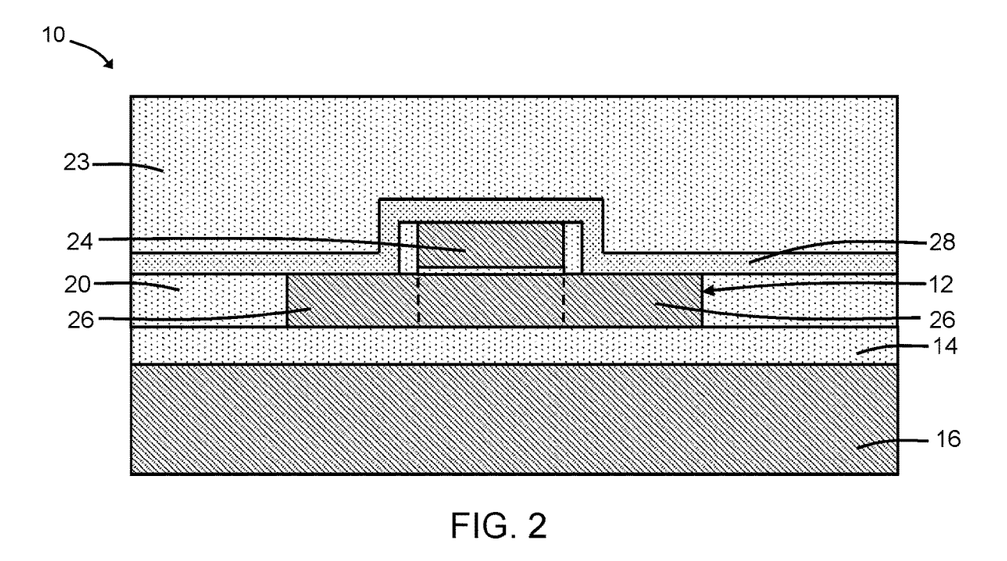
FIG. 2 is a cross-sectional view of a different portion of the photonics chip at the initial fabrication stage of the processing method.

With reference to FIGS. 1, 2 and in accordance with embodiments of the invention, a field-effect transistor 10 may be located in a region of a silicon-on-insulator (SOI) wafer. The SOI wafer may include a device layer 12, a buried insulator layer 14, and a substrate 16 separated from the device layer 12 by the buried insulator layer 14. The buried insulator layer 14 may be composed of a dielectric material, such as silicon dioxide, and the device layer 12 and substrate 16 that may be composed of a single-crystal semiconductor material, such as single-crystal silicon.

A waveguide core 18 may be located in a different region of the SOI wafer. The waveguide core 18 may be formed by patterning the single-crystal semiconductor material of the device layer 12 with lithography and etching processes in which an etch mask is formed over the device layer 12 and the masked device layer 12 is etched with an etching process, such as reactive ion etching. The waveguide core 18 is positioned in direct contact with the buried insulator layer 14. The waveguide core 18 may have a width, w1, in a lateral direction between its opposite sidewalls. The waveguide core 18 may have a ridge construction, as shown. Alternatively, the waveguide core 18 may have a rib construction with an added slab layer.

The waveguide core 18 may be embedded in a dielectric layer 20. The dielectric layer 20 is deposited over the waveguide core 18 and buried insulator layer 14 and then planarized with chemical-mechanical polishing to provide a flat top surface. The dielectric layer 20 may be composed of a dielectric material, such as silicon dioxide. The dielectric layer 20 may also be used to provide shallow trench isolation in the device layer 12 for the field-effect transistor 10.

Dielectric layers 21, 22, 23 may be located in a heterogeneous multilayer stack over the waveguide core 18 and the dielectric layer 20. The dielectric layer 22 may have a different composition than the dielectric layers 21, 23. In an embodiment, the dielectric layers 21, 23 may be composed of, for example, silicon dioxide, and the dielectric layer 22 may be composed of, for example, silicon nitride. The total thickness of dielectric layer 21 may include contributions from a portion of the gate dielectric layer of the field-effect transistor 10 that is also deposited in the region including the waveguide core 18 and an additional deposited layer. The dielectric layer 23, which is thicker than either dielectric layer 21 or dielectric layer 22, has a thickness that is sufficient to protect the field-effect transistor 10 during subsequent etching processes. In an embodiment, the thickness of the dielectric layer 23 may range from about 50 nanometers to about 500 nanometers.

In an alternative embodiment, the dielectric layer 22 may be omitted from the heterogeneous multilayer stack, and the dielectric layers 21, 23 may be combined into a single dielectric layer on which a waveguide core is subsequently formed as subsequently described.

The field-effect transistor 10, which is fabricated by front-end-of-line CMOS processing, may include a gate electrode 24 and a gate dielectric formed by depositing a layer stack and patterning the layer stack with photolithography and etching. The gate electrode 24 may be composed of a gate conductor, such as doped polycrystalline silicon (i.e., polysilicon), and the gate dielectric may be composed of an electrical insulator, such as silicon dioxide. The field-effect transistor 10 may include other elements such as source/drain regions 26, silicide on the source/drain regions 26, halo regions, lightly doped drain extensions, non-conductive sidewall spacers on the gate electrode 24, and a stress liner 28 composed of silicon nitride over the region and above the field-effect transistor 10. The stress liner 28 is a different layer that is distinct from the dielectric layer 22.

Figure 3:
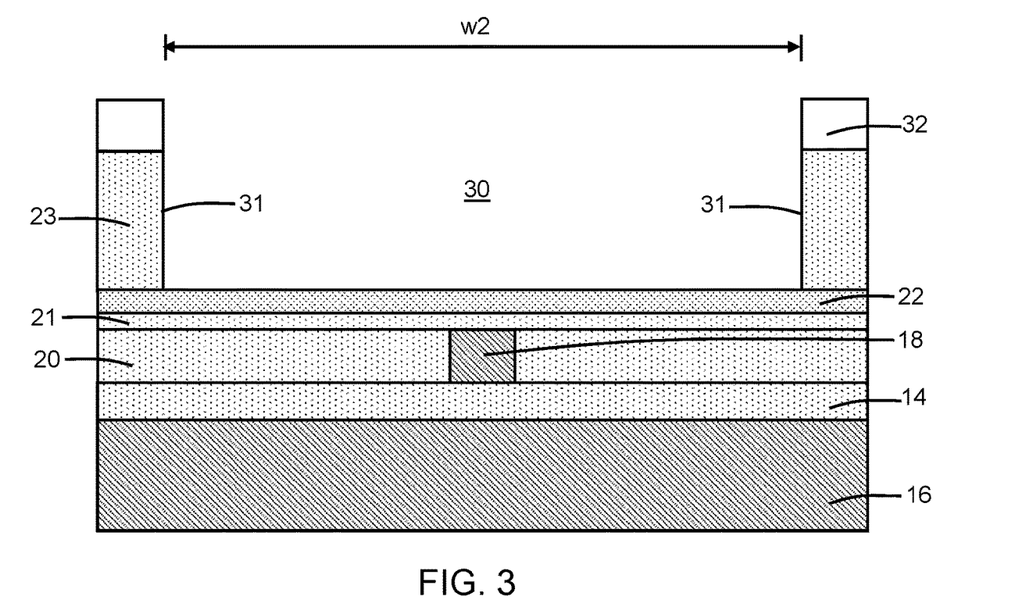
FIGS. 3 and 4 are cross-sectional views at a fabrication stage respectively subsequent to FIGS. 1 and 2.
Figure 4:
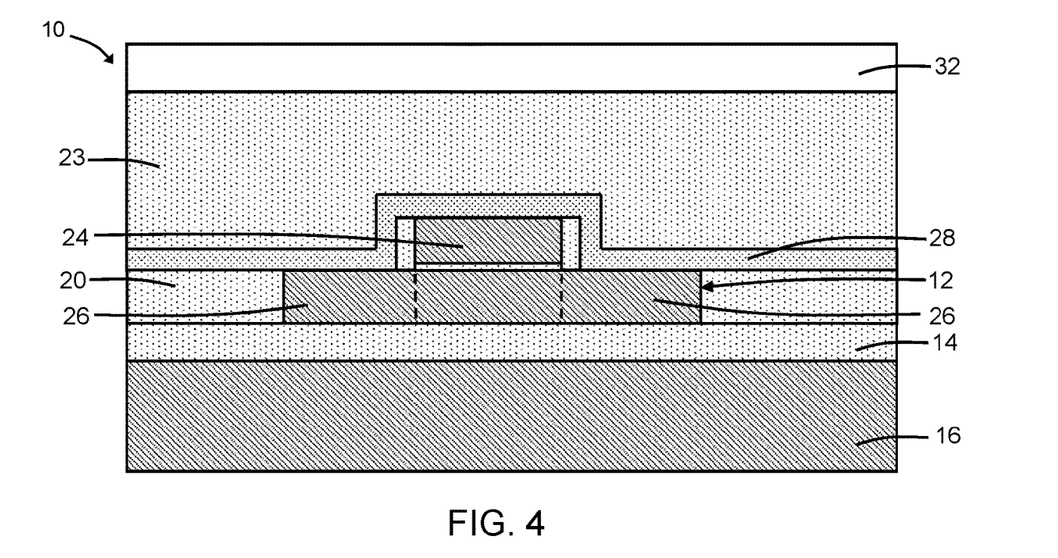

With reference to FIGS. 3, 4 in which like reference numerals refer to like features in FIGS. 1, 2 and at a subsequent fabrication stage, a trench 30 may be patterned in the dielectric layer 23 in the region that includes the waveguide core 18. To that end, an etch mask 32 is formed by a lithography process over the dielectric layer 23 in both regions of the SOI wafer. The unmasked section of the dielectric layer 23 is etched and removed with an etching process, such as reactive ion etching, thereby forming the trench 30. The etching process may be selected to stop on the material of the dielectric layer 22 after penetrating fully through the dielectric layer 23. The trench 30 may have a width, w2, between its opposite sidewalls 31 that is selected during patterning, and that is greater than the width of the waveguide core 18.

Figure 5:
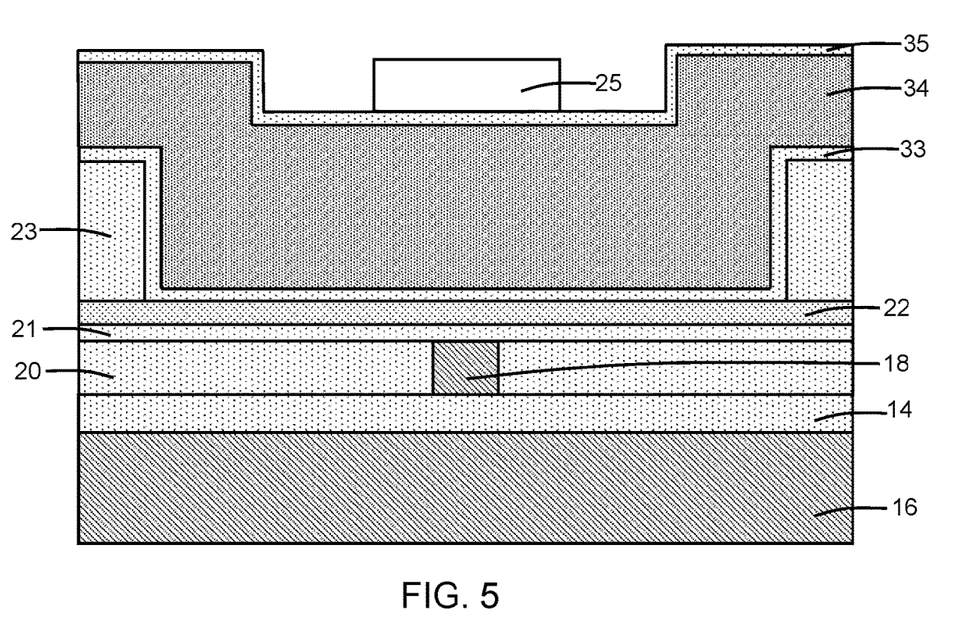
FIGS. 5 and 6 are cross-sectional views at a fabrication stage respectively subsequent to FIGS. 3 and 4.
Figure 6:
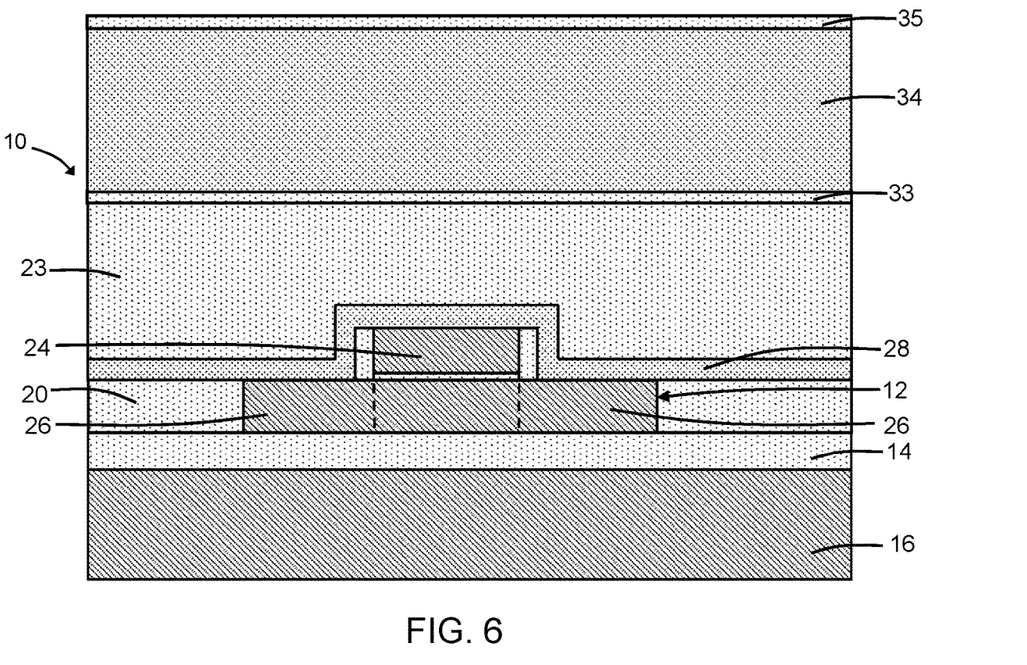

With reference to FIGS. 5, 6 in which like reference numerals refer to like features in FIGS. 3, 4 and at a subsequent fabrication stage, a heterogenous layer stack including dielectric layers 33, 34, 35 are formed over the regions of the SOI wafer. The dielectric layer 34 may be composed of a different dielectric material than the dielectric layers 33, 35. In an embodiment, the dielectric layers 33, 35 may be composed of, for example, silicon dioxide, and the dielectric layer 34 may be composed of, for example, silicon nitride. In alternative embodiments, the layer 34 may be composed of a different category of material, such as polycrystalline silicon (i.e., polysilicon), instead of a dielectric material. The dielectric layer 34 may be significantly thicker than either of the dielectric layers 33, 35.

An etch mask 25 is formed by a lithography process over the dielectric layer 35 in both regions of the SOI wafer. The etch mask 25 has a width selected to dimension the subsequently-etched dielectric layer 34, as subsequently discussed.

Figure 7:
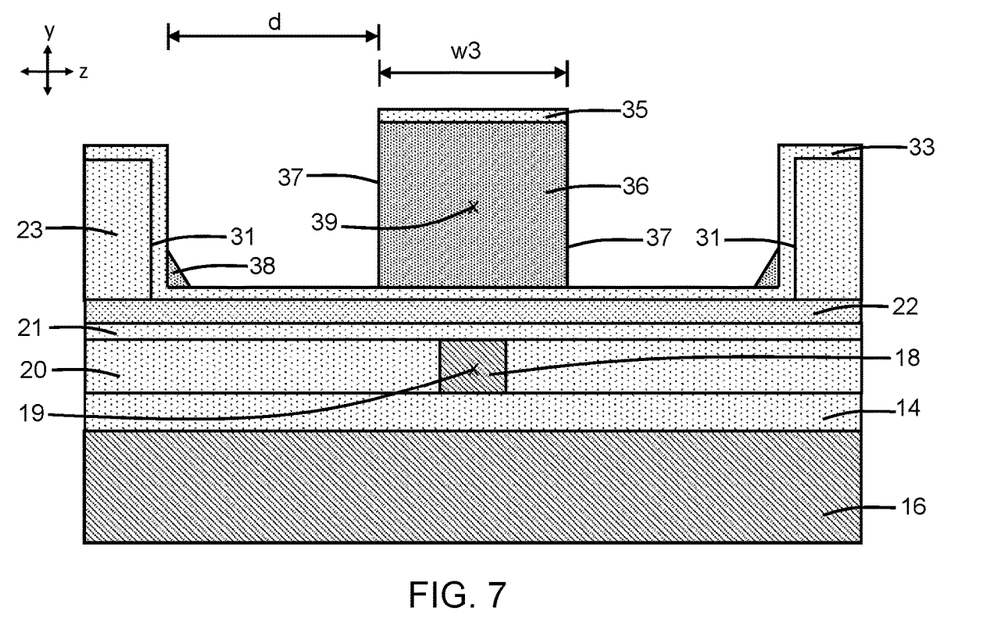
FIGS. 7 and 8 are cross-sectional views at a fabrication stage respectively subsequent to FIGS. 5 and 6.
Figure 7A:
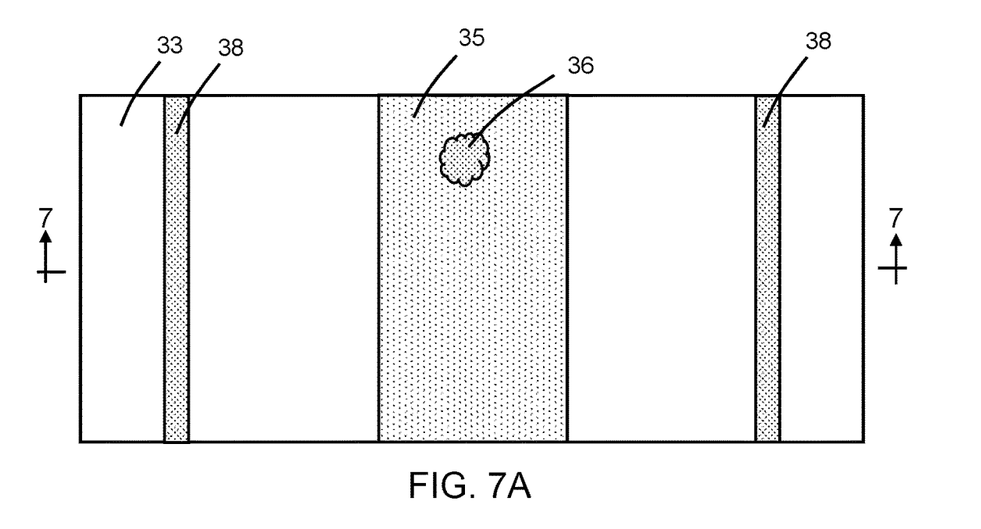
Figure 8:
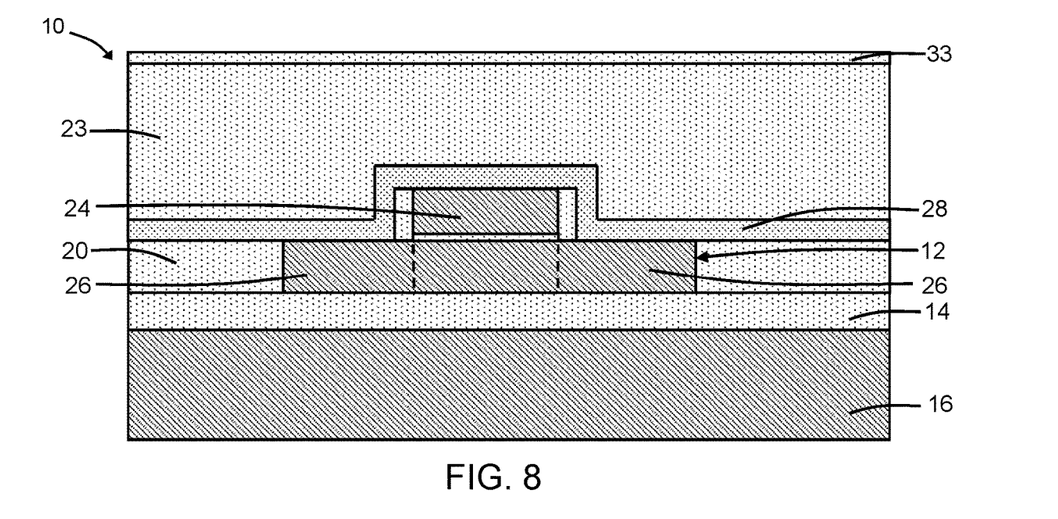

With reference to FIGS. 7, 7A, 8 in which like reference numerals refer to like features in FIGS. 5, 6 and at a subsequent fabrication stage, the dielectric layer 35 may be patterned with an etching process while masked by the etch mask 25 to form a hardmask having the given dimensions of the etch mask 25 and located over the dielectric layer 34. After stripping the etch mask 25, the dielectric layer 34 is then patterned with an etching process to form a waveguide core 36 having the dimensions of the hardmask. Unmasked portions of the dielectric layer 34 are removed by the etching process from the region of the SOI wafer including the waveguide cores 18, 36. Both dielectric layers 34, 35 are completely removed by the etching process from the region of the SOI wafer including the field-effect transistor 10. The etching process may stop on the material of the dielectric layer 33 inside the trench 30 and stop on the dielectric layers 23 and 33 outside of the trench 30.

The waveguide core 36 may be positioned directly over the waveguide core 18 with the dielectric layers 21, 22 and the dielectric layer 33 intervening between them. The waveguide core 36 has sidewalls 37, and a width, w3, representing a distance separating opposite sidewalls 37. The waveguide core 36 is positioned between the sidewalls 31 of the trench 30 with the opposite sidewalls 37 of the waveguide core 36 spaced from the respective nearest sidewall 31 of the trench 30 by a distance, d. In an embodiment, the waveguide core 36 may be symmetrically positioned between the sidewalls 31 of the trench 30 with the opposite sidewalls 37 spaced from the nearest sidewall 31 of the trench 30 by substantially equal distances. The spaced relationship of the sidewalls 31 of the trench 30 and the sidewalls 37 of the waveguide core 36 defines unfilled gaps arranged between the adjacent pairs of sidewalls 31, 37.

A centerline 19 of the waveguide core 18 may be aligned parallel or substantially parallel to a centerline 39 of the waveguide core 36. If symmetrically positioned, the centerline 19 of the waveguide core 18 may be laterally located (e.g., in the z-direction) to be positioned directly over the centerline 39 of the waveguide core 36 in a vertical direction (e.g., in the y-direction). In an alternative embodiment, the waveguide core 36 may be asymmetrically positioned between the sidewalls 31 of the trench 30.

In an embodiment, the width of the waveguide core 36 may be greater than the width of the waveguide core 18. In an embodiment, the width of the trench 30 may be within a range of about 1 to about 3 times the wavelength of the light that will be propagating through and guided by the waveguide core 36 during use. In an embodiment, the width of the trench 30 may be within a range of about 1.2 to about 2.3 times the wavelength of the light that will be propagating through and guided by the waveguide core 36 during use. Exemplary wavelengths for the light may be in a range of 400 nanometers to 1260 nanometers.

Residual rails 38 composed of the dielectric material of the dielectric layer 34 are formed by the etching process as defects or artifacts over the dielectric layer 22 in the lower corners of the trench 30 in the dielectric layer 23. The rails 38 represent dielectric material of the dielectric layer 34 that is not readily removable by the etching process. The width of the trench 30 and the width of the waveguide core 36 are selected such that the rails 38 are laterally displaced by a minimum distance from the waveguide core 36. The trench 30 in the dielectric layer 23 eliminates the thickness of the dielectric layer 23 over the waveguide core 18 to promote efficient coupling between the waveguide cores 18, 36, while at the same time increasing protection for the field-effect transistor 10 against etching damage when the waveguide core 36 is formed. The offset distance between the rails 38 and the waveguide cores 18, 36 may be selected such that the rails 38 have a negligible impact on optical coupling between the waveguide core 18 and the waveguide core 36 during use.

The waveguide core 36 provides an optical component that may be used as part of a waveguide to route optical signals across a photonics chip. Alternative, the waveguide core 36 may also be embodied in a different type of optical component, such as a resonator or an optical switch. In embodiments, the waveguide core 36 may be embodied in a waveguide taper that is tapered along its length, a curved waveguide bend, or a straight waveguide section, and the shape of the trench 30 may be adjusted to reflect the specific shape.

Figure 9:
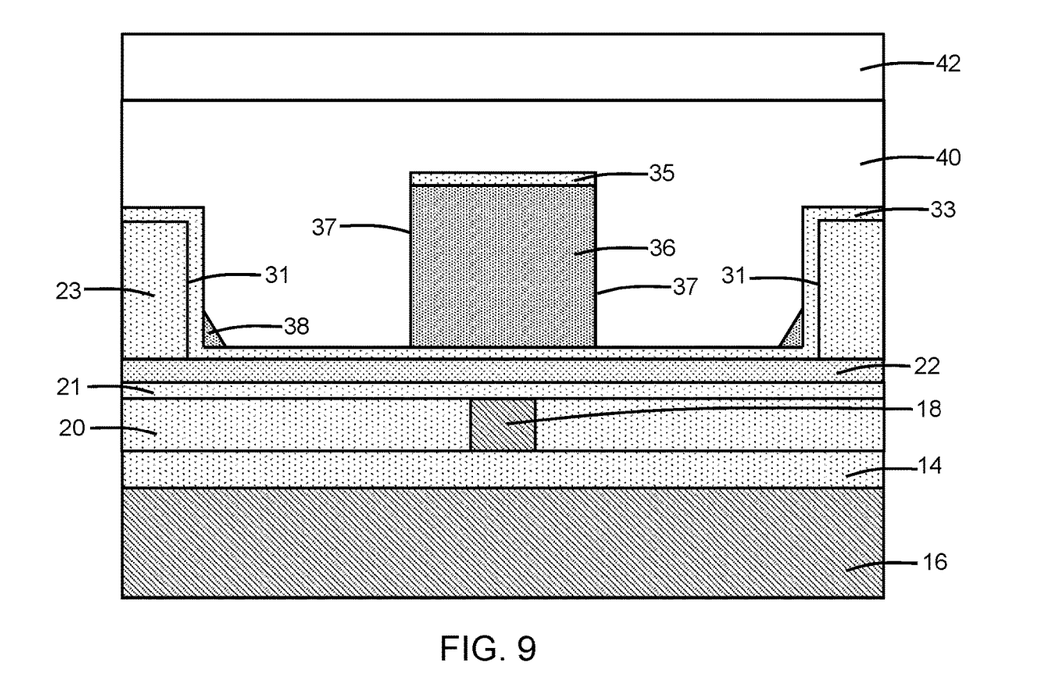
FIGS. 9 and 10 are cross-sectional views at a fabrication stage respectively subsequent to FIGS. 7 and 8.
Figure 10:
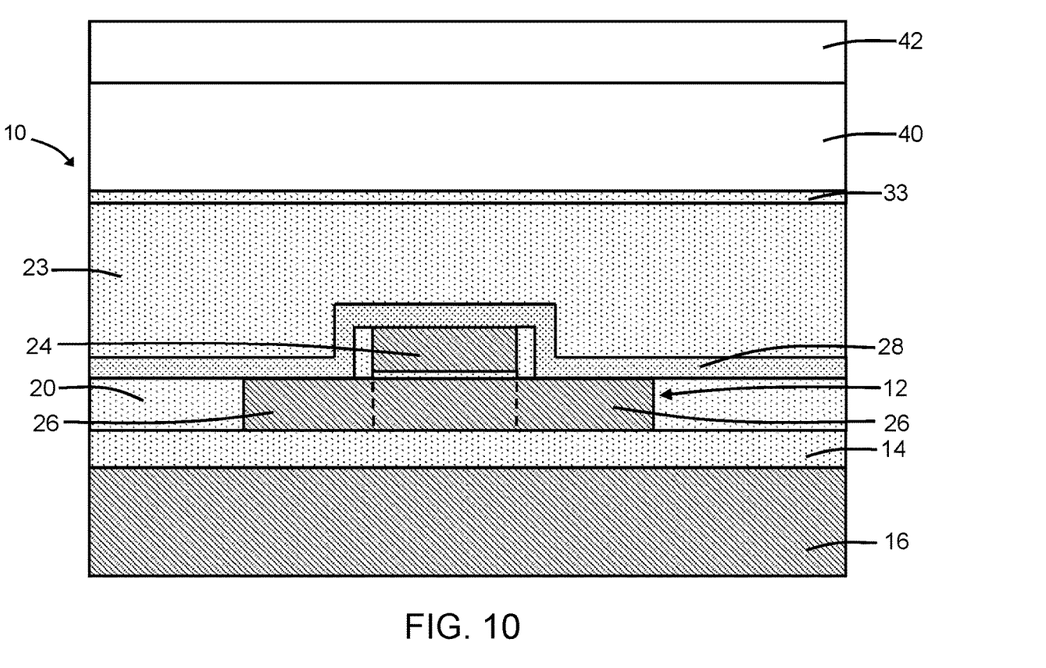

With reference to FIGS. 9, 10 in which like reference numerals refer to like features in FIGS. 7, 8 and at a subsequent fabrication stage, a dielectric layer 40 is formed over the dielectric layer 23 and inside the trench 30 over the waveguide core 36. The dielectric layer 40 may be composed of a dielectric material, such as silicon dioxide, deposited by chemical vapor deposition. For example, the dielectric layer 40 may be composed of silicon dioxide deposited by chemical vapor deposition using ozone and tetraethylorthosilicate (TEOS) as reactants. The dielectric layer 40 may be an interlayer dielectric layer containing contacts that extend to electronic components, such as the field-effect transistor 10, on the photonics chip.

A back-end-of-line stack, generally indicated by reference numeral 42, may be formed over the dielectric layer 40. The back-end-of-line stack 42 may include one or more interlayer dielectric layers composed of dielectric materials, such as doped silicon oxides. The back-end-of-line stack 42 may also include wiring composed of, for example, copper, tungsten, or cobalt that may be arranged in the one or more interlayer dielectric layers and that may be coupled to the contacts in the dielectric layer 40.

Figure 11:
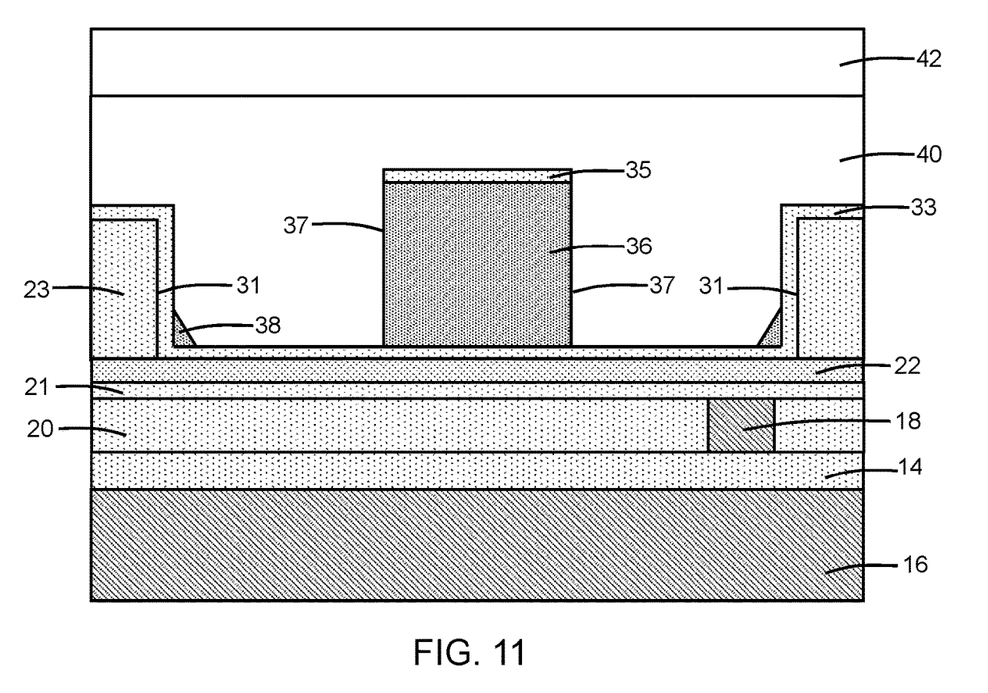
FIGS. 11 and 12 are cross-sectional views of structures in accordance with alternative embodiments.

With reference to FIG. 11 in which like reference numerals refer to like features in FIG. 9 and in accordance with alternative embodiments, the waveguide core 18 may be repositioned within the dielectric layer 20 such that the waveguide core 18 is no longer directly beneath the waveguide core 36. The lateral offset between the waveguide core 18 and the waveguide core 36 may be effective to prevent light coupling between the waveguide core 18 and the waveguide core 36.

Figure 12:
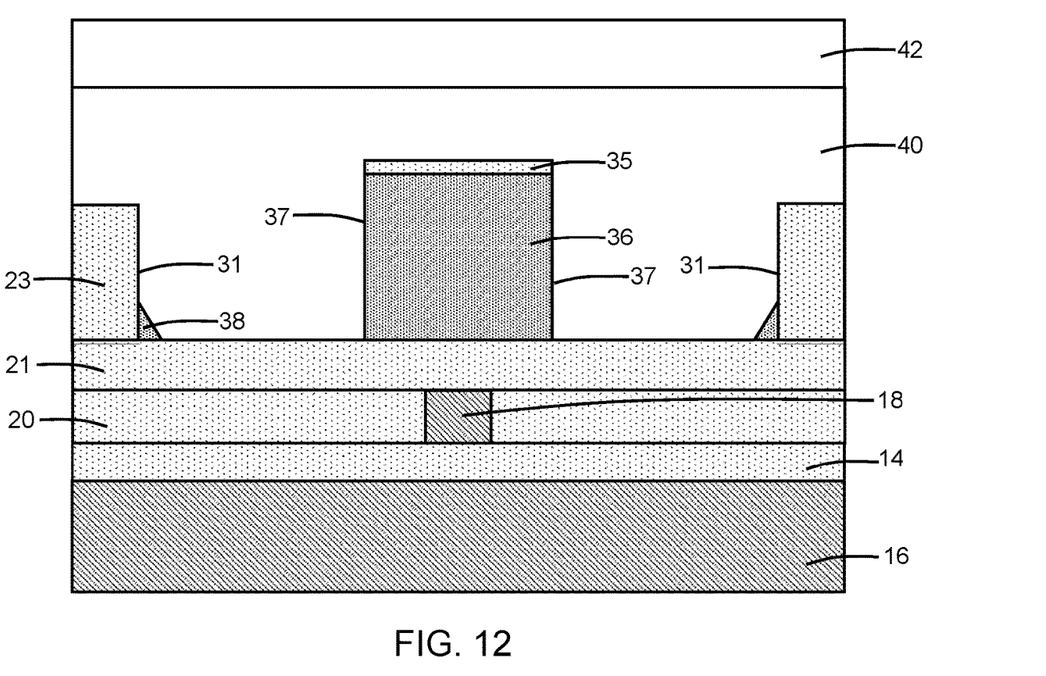

With reference to FIG. 12 in which like reference numerals refer to like features in FIG. 9 and in accordance with alternative embodiments, the dielectric layer 22 may be eliminated from the structure. The dielectric layer 33 may also be eliminated because the dielectric layer 21 operates as an etch stop when the dielectric layer 23 is patterned to provide the waveguide core 36. The waveguide core 36 is positioned in direct contact with the dielectric layer 22. The waveguide core 36 is positioned directly over the waveguide core 18 with only the dielectric layer 21 intervening between them. The dielectric layer 21 may be thickened to provide adequate separation between the waveguide core 18 and the waveguide core 36.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first dielectric layer including a trench with a first sidewall and a second sidewall;
   a second dielectric layer below the first dielectric layer;
   a first waveguide core positioned inside the trench between the first sidewall and the second sidewall of the trench; and
   a second waveguide core in the second dielectric layer,
   wherein the first waveguide core has a first width, and the trench has a second width between the first sidewall and the second sidewall that is greater than the first width.

2. The structure of claim 1 wherein the second width of the trench is equal to about 1 to about 3 times a wavelength of light that will be guided by the first waveguide core.

3. The structure of claim 1 wherein the first waveguide core is symmetrically positioned between the first sidewall and the second sidewall of the trench.

4. The structure of claim 1 wherein the second waveguide core is positioned directly below the first waveguide core.

5. The structure of claim 1 wherein the second waveguide core is laterally offset from the first waveguide core.

6. The structure of claim 1 further comprising:
   a multilayer stack arranged between the first waveguide core and the second waveguide core, the multilayer stack including a third dielectric layer comprised of a first dielectric material and a fourth dielectric layer comprised of a second dielectric material having a different composition than the first dielectric material.

7. The structure of claim 1 wherein the first waveguide core is comprised of silicon nitride.

8. The structure of claim 7 wherein the second waveguide core is comprised of single-crystal silicon.

9. The structure of claim 1 wherein the first dielectric layer has a thickness of about 50 nanometers to about 500 nanometers.

10. A structure comprising:
a dielectric layer including a trench with a first sidewall and a second sidewalk; and
a waveguide core positioned inside the trench between the first sidewall and the second sidewall of the trench,
wherein the first waveguide core is comprised of silicon nitride, the waveguide core has a first width, and the trench has a second width between the first sidewall and the second sidewall that is greater than the first width.

11. The structure of claim 1 wherein the first waveguide core is positioned in a first region of a substrate, and further comprising:
a field-effect transistor positioned in a second region of the substrate,
wherein the trench in the first dielectric layer is positioned over the first region of the substrate, and the first dielectric layer is positioned over the field-effect transistor in the second region of the substrate.

12. A method comprising:
forming a first dielectric layer and a second dielectric layer below the first dielectric layer;
forming a trench in the first dielectric layer that includes a first sidewall and a second sidewall;
forming a first waveguide core that is positioned inside the trench between the first sidewall and the second sidewall of the trench; and
forming a second waveguide core in the second dielectric layer,
wherein the first waveguide core has a first width, and the trench has a second width between the first sidewall and the second sidewall that is greater than the first width.

13. The method of claim 12 wherein the second waveguide core is positioned directly below the first waveguide core.

14. The method of claim 12 wherein forming the first waveguide core that is positioned inside the trench between the first sidewall and the second sidewall of the trench comprises:
depositing a layer that fills the trench; and
patterning the layer to form the first waveguide core.

15. The method of claim 14 wherein the layer is comprised of silicon nitride.

16. The method of claim 14 wherein the first waveguide core is formed in a first region of a substrate, the layer is patterned using an etching process, and further comprising:
forming a field-effect transistor in a second region of the substrate,
wherein the trench in the first dielectric layer is positioned over the first region of the substrate, and the first dielectric layer is positioned over the field-effect transistor in the second region of the substrate during the etching process.

17. The method of claim 12 wherein the second width of the trench is equal to about 1 to about 3 times a wavelength of light that will be guided by the first waveguide core, and the first waveguide core is symmetrically positioned between the first sidewall and the second sidewall of the trench.

18. The method of claim 14 wherein a first residual rail and a second residual rail comprised of a material of the layer are respectively formed adjacent to the first sidewall and the second sidewall of the trench when the layer is patterned to form the first waveguide core, and the second width of the trench is equal to about 1 to about 3 times a wavelength of light that will be guided by the first waveguide core.

19. The structure of claim 1 wherein the first dielectric layer is comprised of silicon dioxide.

20. The structure of claim 10 wherein the dielectric layer is comprised of silicon dioxide.

* * * * *